Oct. 30, 1951     A. J. BENT     2,573,384
SELF-ALIGNING PISTON AND PISTON ROD
Filed July 3, 1948
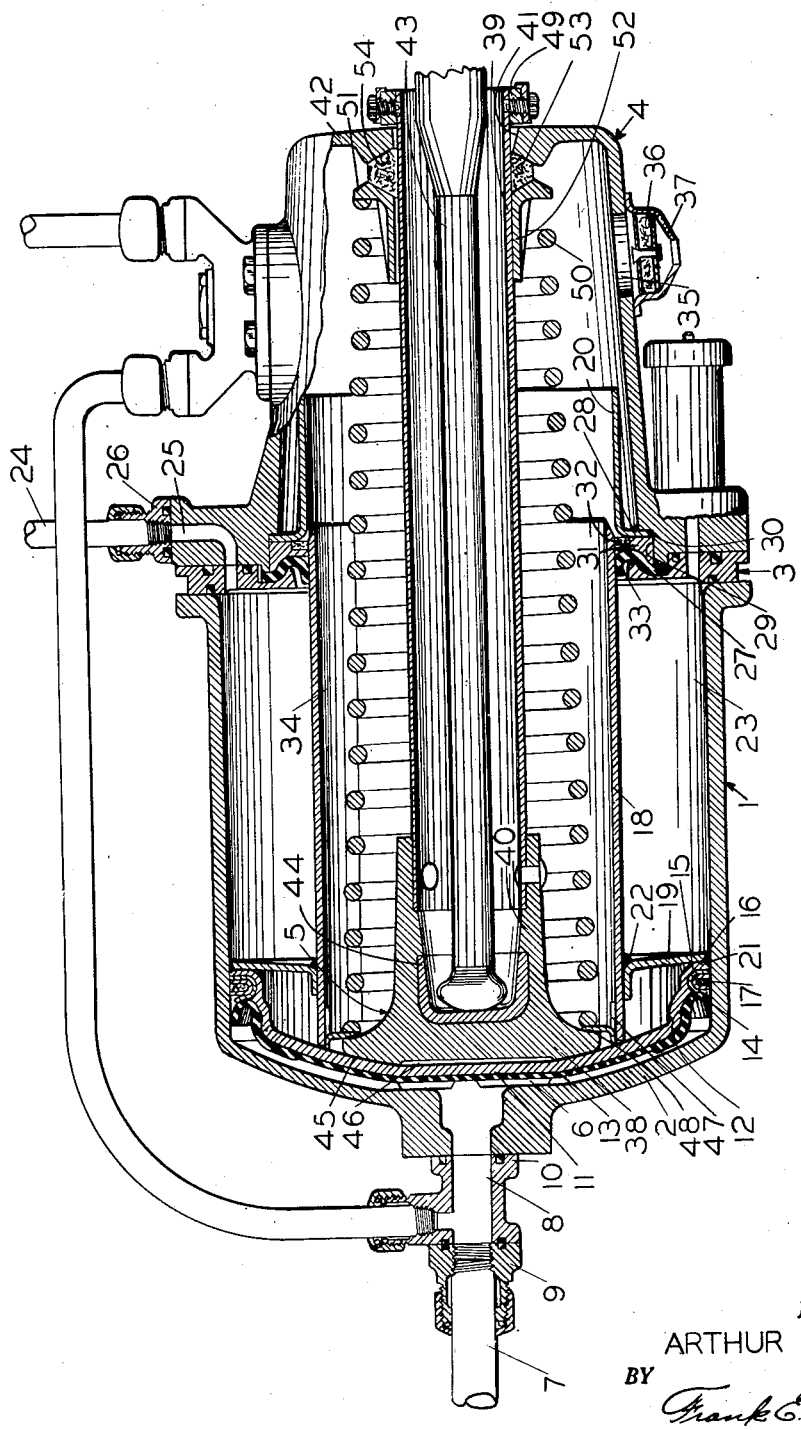
INVENTOR.
ARTHUR J. BENT
BY Frank E. Miller
ATTORNEY Patented Oct. 30, 1951

2,573,384

UNITED STATES PATENT OFFICE 2,573,384

SELF-ALIGNING PISTON AND PISTON ROD

Arthur J. Bent, Pittsburgh, Pa., assignor to Westinghouse Air Brake Company, a corporation of Pennsylvania Original application July 31, 1947, Serial No. 764,941. Divided and this application July 3, 1948, Serial No. 36,848

2 Claims. (Cl. 309—20)

This invention relates to a self-aligning piston and piston rod assemblage particularly adapted for use in a variable load fluid pressure brake cylinder device of the type disclosed in my copending application, Serial No. 764,941, filed July 31, 1947, of which the present application is a division.

It is the prime object of the invention to provide an improved self-aligning piston and piston rod assemblage particularly adapted for use in a brake cylinder device of the type above referred to.

Other objects and advantages will be apparent from the following more detailed description of the invention.

In the accompanying drawing, the single figure is a diagrammatic sectional view taken longitudinally through a brake cylinder device embodying the invention.

As shown in the drawing, the improved brake cylinder device comprises a hollow cylindrical casing 1 which may be cast of aluminum to reduce its weight to a minimum commensurate with strength, and which is closed at one end by a preferably integral pressure head 2. To the open end of the casing 1 is secured an annular pressure head 3 interposed between said casing and a cup-shaped non-pressure head 4 which are secured together by bolts (not shown). The heads 3 and 4 also are preferably formed of aluminum to reduce their weight. A brake cylinder piston assemblage 5 is slidably mounted in the casing 1, and at one side thereof is the usual or a main pressure chamber 6 to which is connected a pipe 7 by way of registering passages 8 extending through removable fittings 9 and 10 and centrally through the pressure head 2. The pipe 7 is adapted to be connected in turn to a fluid pressure control valve device (not shown), such as the well-known AB valve, to effect variations in pressure of fluid in the pressure chamber 6 for controlling and operating piston assemblage 5.

The piston assemblage 5 comprises a piston head 11 which may be formed of drawn steel to reduce to a minimum the amount of machine work necessary to form it. This head is provided with a circular flat central portion and an annular portion encircling the flat central portion which annular portion is in the form of a portion of a sphere. An annular peripheral groove 12 is machined in the head 11 for securing a resilient snap-on packing cup 13, disposed in the chamber 6, to one face of said head. The packing cup 13 is provided with an annular U-shaped portion 14, which portion is open to chamber 6 and which curves into slidable contact with the inner wall of the casing in such a manner that pressure of fluid in said chamber acts thereon to urge it into sealing engagement with said wall for preventing leakage of fluid under pressure past the piston head. An annular substantially U-shaped metal ring 15 is interposed between the portion 14 of the packing cup 13 and one face of a radially projecting annular flange 16 attached to the piston head 11. A portion of the ring 15 is curved to form a support for the back of portion 14 of cup 13. A lubricating swab 17, in the form of a felt or similar ring encased in an expander ring, is disposed within the ring 15 and thereby secured to move with the piston head 11 in slidable contact with the casing wall to distribute and store lubricant thereon for a considerable period of time. The outer peripheral edge of the flange 16 attached to the piston head 11 is machined to provide an accurate fit for slidable contact between said head and the casing wall.

A hollow cylindrical member 18, disposed on the opposite side of the piston head 11, is secured adjacent its one end to said head for movement therewith by an annular baffle member 19, and is slidably guided at its opposite end by a sleeve member 20 disposed in and secured to the non-pressure head 4. The annular baffle member 19 is secured at its outer periphery by a continuous weld 21, or other suitable means, to a face of the flange 16 of the piston head 11, and the member 18, which projects through the member 19, is secured to the inner peripheral edge of said member 19 by means of a similar continuous weld 22, or the like. The member 19 for the major portion of its width is dished in the direction toward the piston head 11 for the purpose of imparting rigidity to said member.

An annular compensating pressure chamber 23 is defined by the outer cylindrical surface of member 18 and the inner surface of casing 1 between the annular baffle member 19 and the annular pressure head 3. The chamber 23 is connected to a pipe 24 by way of registering passages 25 in the pressure head 3, the non-pressure head 4 and a removable fitting 26. The pipe 24 is adapted to be connected to a novel relay valve device (not shown), described in the aforementioned copending application, for effecting variations in the pressure of fluid in the chamber 23 in accordance with the degree of loading on the vehicle. Pressure of fluid in the chamber 23 acts on the annular area of the baffle member 19, secured to the piston head 11, in opposition to the force on said head caused by the pressure of fluid in the usual pressure chamber 6, and since the pressure in said chamber 23 is varied in the manner as above described, the effective force delivered by said head for applying the brakes varies in accordance with the degree of loading. The welds 21 and 22 acting to secure member 18 to member 19, and member 19 to piston head 11 serve also to form a seal for preventing fluid under pressure from escaping from the compensating pressure chamber 23 past the baffle member 19. A resilient annular sealing ring 27 is disposed in a groove in the pressure head 3 for slidable engagement with the outer surface of member 18 to prevent leakage of fluid under pressure from chamber 23 past said head.

The sleeve member 20 is provided at one end with an outwardly projecting annular flange 28 which is disposed coaxially with relation to the member 18 in a central counter-bore 29 in the non-pressure head 4. This counter-bore provides a shoulder 30 against which the flange 28 rests. An annular ring member 31 is pressed into the counter-bore 29, which member abuts the flange 28, holding said flange rigidly seated against the shoulder 30, thereby removably securing the sleeve member 20 to the head 4. A lubricating swab 32 in the form of an annular felt ring is mounted in a groove in member 31 for slidable engagement with the outer surface of the member 18.

The sealing ring 27 is provided with an outer flat edge portion which is clamped between the heads 3 and 4 to allow for easy removal and insertion and an inner edge portion 33 is made U-shaped in cross section, similar to portion 14 of cup 13. The portion 33 opens in the direction of the chamber 23 so that action of pressure of fluid therein urges the ring 27 into sealing engagement with the member 18.

The interior of the hollow cylindrical sleeve member 18 forms a non-pressure chamber 34 which opens into the interior of the non-pressure head 4. The non-pressure chamber 34 is constantly open to atmosphere through a breather port 35 in head 4 covered by an air strainer 36 of curled hair or the like. The strainer 36 is disposed in an open cup-shaped retainer 37 secured to the head 4 and encircling the port 35. The port 35 is provided to permit free passage of air into and out of the non-pressure chamber 34 upon reciprocation of the piston head 11 in the casing 1, while the strainer over said port is adapted to prevent dust and dirt from entering said chamber. The strainer 34 is preferably mounted at the lower side of the non-pressure head 4 in order to avoid, insofar as possible, free entrance of dirt and moisture to said strainer.

A base member 38 is disposed within the non-pressure chamber 34 adjacent to the piston head 11. A hollow piston rod 39, of the usual type, is secured at its one end by means of rivets to a boss 40 attached to the member 38. The opposite end of the rod 39 extends through and is slidably guided within a tapered opening 41 in an end wall 42 in the non-pressure head 4. A push rod 43 projects into the rod 39 in the usual manner and abuts a steel insert 44 carried by the aluminum base member 38.

The base member 38 is arranged to move with the piston head 11 for transmitting thrust to the push rod 43, and thence to the brake rigging for applying the brakes (not shown). Clearance is provided between the outer periphery of the base member 38 and the inner wall of the member 18 so that as said base moves with the piston head 11 it is free to adjust itself in a radial direction to correct for any initial misalignment with the piston 11 and the member 18 and thereby prevent binding. The tapered opening 41 in the wall 42 allows the piston rod 39 attached to the base member 38 the necessary freedom for such adjustment.

The face of the base member 38 is provided with an annular curved surface 45, which may be in the shape of a portion of a sphere, for slidable engagement with the corresponding curved surface of the piston head 11. The central portion of the member 38 encircled by the annular curved surface 45 is provided with a cavity 46 of larger diameter than the diameter of the central flat portion of the piston head 11 so that the surface 45 is allowed freedom for travel on said head 11 to provide for the previously described radial adjustment.

A retaining member 47 in the form of a thin hollow cylinder is spot-welded to the inner wall of the cylindrical member 18. The member 47 is provided with a plurality of spaced-apart thin yieldable fingers 48 which are defined by longitudinally extending slots cut in the member 47. The fingers 48 are bent into engagement with the member 38 and act to hold said member and piston head 11 together during removal of the casing 1 from the non-pressure head 4. For example, if inspection of the packing cup 13 is desired, the casing 1 is unbolted from the non-pressure head 4 and said casing is slipped off over the piston assemblage 5 to expose said packing cup. A retaining ring 49 in the usual form, secured to the outer end of piston rod 39 prevents the member 38 from moving in the direction of the left-hand, as viewed in the drawing, and the retainer member 47 comprising the fingers 48 anchors the member 18 and attached piston head 11 to said base member 38 to prevent them from moving with the casing.

The fingers 48 are flexible so that, whereas they are of sufficient strength to serve to anchor the piston head 11 to the base member 38, they yield to allow said base to move radially during the previously described aligning adjustment. One end of a compression return spring 50 seats on the flexible fingers 48, urging said fingers into contact with the member 38 and, in turn, urging said member into contact with the piston head 11, so that once said member has moved to an adjusted position with respect to said piston head it will be held in the adjusted position by friction and the yieldable clamping action of the spring and fingers, it being understood that the structure is at all times automatically adjustable to prevent any bending action on the movable parts of the piston assemblage.

The compression return spring 50 is provided to serve the usual purpose of returning the piston assemblage 5 to its normal brake released position, as shown in the drawing, in effecting the release of a brake application. The spring 50 is disposed in the non-pressure chamber 34 encircling the piston rod 39 and is tapered to prevent it from cocking as it is further compressed during travel of the piston assemblage 5. The opposite end of the spring 50 seats on an annular seat flange 51 attached to a sleeve 52 which is slidably mounted on the piston rod 39. An annular V-shaped resilient porous filter member 53 encircles the rod 39 and is interposed between a beveled face of the flange 51 and a beveled shoulder 54 formed in the end wall 42 encircling the tapered opening 41 in the nonpressure head 4. The filter member 53 is squeezed, by action of the spring 50, between the flange 51 and shoulder 54 into contact with the outer surface of the piston rod 39 and with the portion of wall 42 encircling the opening 41 so that any air entering through said opening which may be carrying dust or dirt must pass through the member 53 and thereby be filtered or cleaned.

Since the welds 21 and 22 serve to secure the baffle member 19 to the piston head 11 and the cylindrical member 18 to said baffle, as well as serve to seal off the compensating pressure chamber 23 encircling the member 18 from the nonpressure chamber within said member 18, said welds may be pressure tested to prove their sealing qualities. It will be appreciated that means other than welding, such as brazing or soldering might be employed to serve the same purpose.

The sealing ring 27 cooperating with the outer wall of cylindrical member 18 is protected from excessive wear due to abrasive action of dust and dirt by virtue of its location within the brake cylinder device into which no dust laden air is allowed to flow, either directly or indirectly. The ring 27 is further protected from excessive wear by virtue of its cooperation with the member 18, which remains entirely enclosed within the casing of the brake cylinder device at all times and is not subjected to corrosive action of the elements, consequently the member 18 presents clean smooth surface for slidable sealing contact with said ring.

While only one illustrative embodiment of the invention has been shown and described in detail, it is not my intention to limit its scope to that embodiment or otherwise than by the terms of the appended claims.

Having now described my invention, what I claim as new and desire to secure by Letters Patent, is:

1. A piston assemblage comprising a piston head, a sleeve member having one end abutting said head, an annular member encircling said sleeve member and having an annular air tight securing joint with said sleeve member and also having an air tight securing joint with said head adjacent its periphery, a piston rod extending through said sleeve member into abutting relation with said head, the abutting surfaces of said head and rod being respectively concave and convex in sliding contact with each other, and means attached to said sleeve member for retaining said rod in proximity to said head and providing for slidable movement of the abutting end of said rod radially on said head.

2. A piston assemblage comprising a piston head, a sleeve member having one end abutting said head, an annular member encircling said sleeve member and having an annular air tight securing joint with said sleeve member and also having an air tight securing joint with said head adjacent its periphery, a piston rod extending through said sleeve member into abutting relation with said head, the abutting surfaces of said head and rod being respectively concave and convex in sliding contact with each other, means attached to said sleeve member for retaining said rod in proximity to said head and providing for slidable movement of the abutting end of said rod radially on said head, and spring means arranged to bias said piston rod in the direction of said piston head.

ARTHUR J. BENT.

REFERENCES CITED

The following references are of record in the file of this patent:

UNITED STATES PATENTS

| Number | Name | Date |
|---|---|---|
| 1,488,796 | Parsons | Apr. 1, 1924 |
| 1,914,268 | Lewis | June 13, 1933 |
| 1,996,826 | Ohmart | Apr. 9, 1935 |
| 2,105,494 | Palmer | Jan. 18, 1938 |
| 2,451,216 | Halfvarson | Oct. 12, 1948 |